United States Patent [19]

Vodoklys

[11] 4,071,465
[45] Jan. 31, 1978

[54] DEEP-RED EMITTING PHOSPHOR

[75] Inventor: Frank M. Vodoklys, Wayne, N.J.

[73] Assignee: Westinghouse Electric Corporation, Pittsburgh, Pa.

[21] Appl. No.: 788,209

[22] Filed: Apr. 18, 1977

[51] Int. Cl.$^2$ .............................................. C09K 11/38
[52] U.S. Cl. ........................ 252/301.4 F; 252/301.4 R
[58] Field of Search .................... 252/301.4 F, 301.4 R

[56] References Cited

U.S. PATENT DOCUMENTS

| 2,227,418 | 1/1941 | Addink | 252/301.4 R X |
| 2,919,363 | 12/1959 | Crosby et al. | 252/301.4 R X |
| 3,550,033 | 12/1970 | Ohlmann et al. | 252/301.4 R X |
| 3,755,536 | 8/1973 | Bither | 252/301.4 R X |

FOREIGN PATENT DOCUMENTS 548,997  11/1942  United Kingdom .......... 252/301.4 R

*Primary Examiner*—Jack Cooper
*Attorney, Agent, or Firm*—R. S. Lombard

[57] ABSTRACT

A luminescent composition excited by ultraviolet or selected visible wavelength radiations consisting essentially of aluminum oxide-germanium dioxide matrix activated by chromium. The composition provides strong line emissions in the deep red.

3 Claims, 2 Drawing Figures

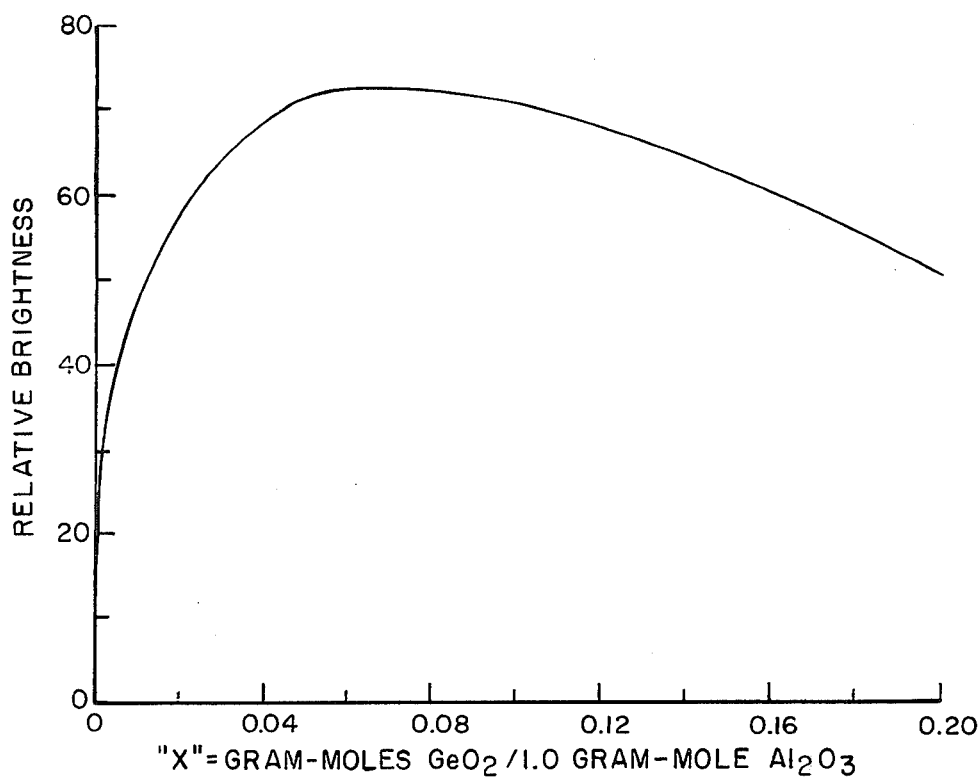
FIG. I
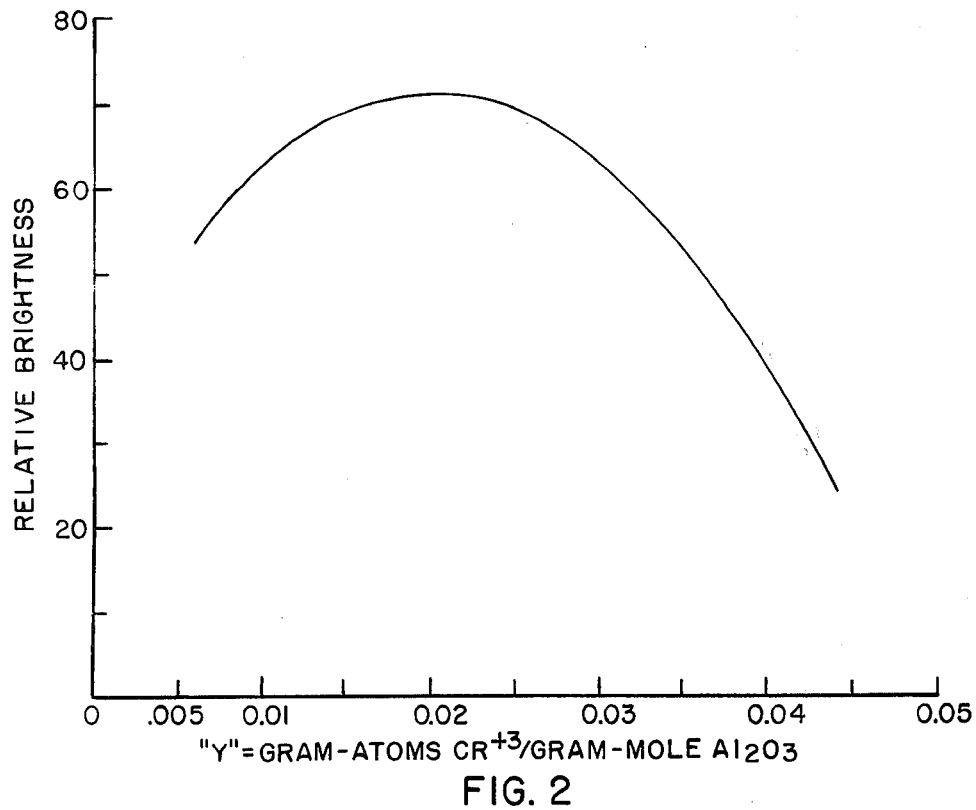
FIG. 2

DEEP-RED EMITTING PHOSPHOR

BACKGROUND OF THE INVENTION

The luminescent composition consisting essentially of aluminum oxide activated by chromium is well known. This composition gives a line emission in the deep red. Line-emitting phosphors have been found useful in a number of applications. In U.S. Pat. No. 3,772,099, dated Nov. 13, 1973, issued to Ryan et al and assigned to the present assignee is disclosed the use of line-emitting phosphors for providing a distinctive information label for identifying explosives. A predetermined combination of line-emitting phosphors can be used as "coding" phosphors which provide a very individualistic emission when excited by predetermined energy such as ultraviolet radiation. These coding phosphors can provide post-explosion information as to the origin, date of manufacture, and type of explosive used.

SUMMARY OF THE INVENTION

There is provided a luminescent composition excited by ultraviolet or selected visible wavelength radiations consisting essentially of aluminum oxide-germanium dioxide matrix activated by chromium. This composition has line emissions in the deep red which are much stronger than the line emissions of the chromium-activated aluminum oxide. This composition consists essentially of $Al_2O_3 \cdot xGeO_2 \cdot yCr$ wherein "$x$" is from about 0.012 to about 0.20 and "$y$" is from about 0.006 to about 0.035.

BRIEF DESCRIPTION OF THE DRAWINGS

For a better understanding of the invention, reference may be had to the accompanying drawings, in which:

FIG. 1 is a graph showing the effect of $GeO_2$ content on the brightness or output of $Al_2O_3 \cdot GeO_2:Cr$; and FIG. 2 is a graph showing the effect of chromium content on the brightness or output of $Al_2O_3 \cdot GeO_2:Cr$.

DESCRIPTION OF THE PREFERRED EMBODIMENTS

This invention relates to a luminescent composition which can be excited to luminescence by ultraviolet or visible wavelength radiations of deep purple or green. X-ray diffraction tests show that this luminescent composition consists essentially of aluminum oxide-germanium dioxide matrix activated by chromium and the formulation can be expressed as $Al_2O_3 \cdot xGeO_2 \cdot yCr$. The graph in FIG. 1 shows the effect of $GeO_2$ content on the output of the luminescent composition. The values of "$x$" are shown on the abscissa versus the relative brightness or output of the composition compared to a similarly prepared phosphor without $GeO_2$ matrix modification. As can be seen from the graph, values of "$x$" from about 0.012 to about 0.20 show a marked increase in relative brightness of the composition compared to the composition where "$x$" is zero. The optimum range of "$x$" as shown in FIG. 1 is from 0.05 to 0.10.

The graph of FIG. 2 shows the values of "$y$" plotted along the abscissa versus the relative brightness or output of the luminescent composition compared to similarly prepared phosphor without the $GeO_2$ matrix modification. The values of "$y$" from about 0.006 to about 0.035 are shown from the graph to have good relative brightness. The optimum values of "$y$" as shown by the graph of FIG. 2 are from 0.015 to 0.025.

This luminescent composition has strong absorption bands at 5600 A (yellowish green) and 4100 A (deep violet). The main emission at room temperature is due to two lines at 6942 A and 6927 A which are deep red. These characteristics make this composition attractive for use as a "coder" in a materials labeling phosphor system such as the one described in the aforesaid Ryan U.S. Pat. No. 3,772,099. When used as a "coder" the present phosphor can be excited by a 4080 A wavelength not common to the vast majority of phosphors, thus simplifying its detection. In addition, because of its sharp, narrow emission lines, its identification among nine or 10 other "coders" is a relatively simple matter.

A typical example of the formulation of the luminescent composition is as follows: 1.00 mole of $Al_2O_3$; 0.08 mole of $GeO_2$; 0.01 mole of $Cr_2O_3$. These compounds are mixed and fired at 1350° C for 4 hours in air. The resulting phosphor has 3.3 times more output than a similarly prepared phosphor without the $GeO_2$ modification of the matrix. Higher firing temperatures may further improve this phosphor's performance, but difficulties may be encountered with crucibles cracking or furnaces not operating properly at such elevated temperatures.

I claim:

1. A luminescent composition which can be excited to luminescence by ultraviolet or by visible wavelength radiations of deep violet or green to emit in the deep red, said composition consisting essentially of $Al_2O_3 \cdot xGeO_2 \cdot yCr$, wherein "$x$" is from about 0.012 to about 0.20 and "$y$" is from about 0.006 to about 0.035.

2. The luminescent composition of claim 1, wherein "$x$" is from 0.05 to 0.10.

3. The luminescent composition of claim 1, wherein "$y$" is from 0.015 to 0.025.

* * * * *